United States Patent
Brack

[11] 3,975,150
[45] Aug. 17, 1976

[54] TRANSFER PRINTING PROCESS
[75] Inventor: Alfred Brack, Odenthal, Germany
[73] Assignee: Bayer Aktiengesellschaft, Leverkusen, Germany
[22] Filed: Aug. 23, 1974
[21] Appl. No.: 500,186

[30] Foreign Application Priority Data
Aug. 24, 1973 Germany............................ 2342723

[52] U.S. Cl.................................. 8/2.5 R; 106/23; 260/279 R; 428/713
[51] Int. Cl.² ............................................ D06P 5/20
[58] Field of Search...................... 8/2.5; 260/279 R

[56] References Cited
UNITED STATES PATENTS
| | | | |
|---|---|---|---|
| 3,188,164 | 6/1965 | Dehn et al. | 8/55 |
| 3,541,099 | 11/1970 | Burdeska et al. | 260/279 |
| 3,624,255 | 11/1971 | Burdeska et al. | 260/279 R |

FOREIGN PATENTS OR APPLICATIONS
| | | | |
|---|---|---|---|
| 951,987 | 3/1964 | United Kingdom | 8/2.5 UX |
| 1,211,149 | 4/1970 | United Kingdom | 8/2.5 UX |

Primary Examiner—Stanford M. Levin
Attorney, Agent, or Firm—Plumley and Tyner

[57] ABSTRACT

The use of compounds of the formula

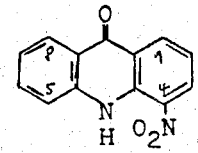

wherein the benzo rings can be substituted by nonionic radicals, for dyeing textiles by transfer printing.

1 Claim, No Drawings

TRANSFER PRINTING PROCESS

The subject of the invention is a process for printing synthetic or part-synthetic materials by the transfer printing principle, which is characterized in that the dyestuffs used are compounds of the formula

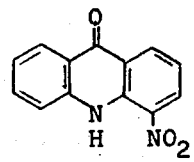
(I)

wherein the benzo rings can be substituted by non-ionic radicals.

"Non-ionic radicals" are to be understood as substituents which are customary in dyestuff chemistry and do not confer solubility in water, such as, for example, halogen atoms or lower alkyl, lower alkoxy, amino, lower alkylamino and lower dialkyl amino, acylamino, nitrile, and carboxylic acid ester groups.

Possible lower alkyl or alkoxy radicals are saturated and unsaturated alkyl radicals with 1–6 C atoms, which can be substituted by, for example, halogen, nitrile, hydroxyl, amino or carboxylic acid ester groups.

Possible acylamino groups are alkylcarbonylamino and alkylsulphonylamino groups and possible carboxylic acid ester groups are alkoxycarbonyl groups, with the alkyl radicals and alkoxy radicals concerned containing 1 to 4 C atoms.

The preferred halogen atoms are F, Cl and Br.

Preferably, the base molecule contains 0 to 2 such non-ionic substituents.

Particularly valuable dyestuffs are mono-nitroacridone itself (formula I) and its mono- and di-chloro, -bromo and -methyl derivatives, the mono-methoxy and -ethoxy derivatives and the mono-chloro (or -bromo)-mono-methoxy(or -ethoxy) derivatives, the substituents preferably being in the 2- and/or 7-position. The method of numbering (according to Beilstein) corresponds to the following scheme:

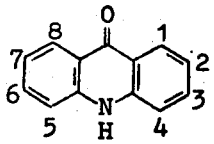

The dyestuffs to be used according to the invention are either known or can be manufactured in a manner which is in itself known.

The transfer printing process which is to be used according to the invention is generally known and has been described, for example, in French Patent Specifications Nos. 1,223,330 and 1,334,829. The dyestuffs are applied, for example, in the form of so-called printing inks, such as are described, for example, in French Patent specification No. 1,573,698, or as pastes, onto so-called temporary supports (paper, other cellulosic materials such as cotton or cellophane, metal foils and the like, such as are known, for example, from French Patent Specification 1,575,069). These printing inks are dyestuff solutions, containing synthetic resin, in suitable organic solvents such as benzene, toluene, xylene, chlorobenzene, chloroform, dichloroethane, trichloroethylene, perchloroethylene, ethanol, isopropanol, benzyl alcohol, cyclohexanone, ethyl acetate or their mixtures. Such printing inks, which are characterised in that they contain dyestuffs of the formula I, and their preparation, also form a subject of the present invention. Substrates suitable for transfer printing with dyestuffs of the formula (I) are textile materials which consist wholly or predominantly of polyesters such as polyethylene glycol terephthalate, poly-1,4-bis-hydroxymethylcyclohexane terephthalate or cellulose triacetate and cellulose 2½-acetate or of polyamides or polyacrylonitrile, but also non-textile plastics articles such as films, tapes or blocks of commercially available polymerisation or polycondensation plastics.

The prints obtained are distinguished by very good fastness properties, especially by very high fastness to light, rubbing and wet processing.

EXAMPLE 1:

20 g of dyestuff of the formula

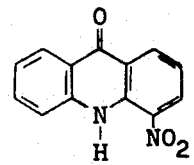

are ground with 0 – 7.5 g of a cyclohexanone-formaldehyde resin which has a softening point above 160°C, and with 10 – 2.5 g of ethylcellulose $N_4$, in a pearl mill. 100 parts of printing ink are prepared by addition of toluene containing 10% of polywaxes. A paper is impregnated with this printing ink. If this paper is pressed against a polyester or polyacrylonitrile textile for 15 – 30 seconds at 180°C, a brilliant yellow print with very good fastness properties is obtained.

EXAMPLE 2:

75 g of the dyestuff used in Example 1 and 50 g of a condensation product of naphthalenesulphonic acid and formaldehyde are finely ground, in the presence of 100 g of water, in a ball mill. A printing ink is prepared from the dispersion thus obtained by thickening with 400 g of a 10% strength carob bean flour ether thickener and 400 g of water. Paper is printed with this paste, using the gravure printing process. If this paper is pressed against a textile of polyester, polyamide or cellulose triacetate fibres for 15–60 seconds at 200°, a deeply coloured, very fast yellow print is obtained.

Fast yellow prints are also obtained if instead of the dyestuff mentioned, 1-chloro-, 2-chloro-, 2-bromo-, 2-methyl-, 2-ethyl-, 2-iso-propyl-, 2-methoxy-, 2-ethoxy-, 2-acetamino-, 2,7-dichloro-, 2-chloro-7-methoxy-, 2-chloro-7-cyano-, 2-chloro-7-fluoro- or 2-chloro-7-methoxycarbonyl-4-nitro-acridone is used.

EXAMPLE 3 100 g of a dyestuff dispersion obtained in accordance with the instructions of Example 2 are intimately mixed with 800 g of water and 100 g of a 5% strength alginate thickener. A cotton fabric web is impregnated with this mixture on a padder. The dried cotton fabric is particularly suitable for transfer printing on bulky materials such as carpets of polyester, polyamide or polyacrylonitrile fibres. Very fast yellow prints are obtained.

I claim:

1. In the process of transfer printing of synthetic and part-synthetic materials with an organic dyestuff the improvement comprising the use of 4-nitro-acridone as said organic dyestuff.

* * * * *